United States Patent [19]
Ogilvie et al.

[11] Patent Number: 5,550,768
[45] Date of Patent: Aug. 27, 1996

[54] ROUNDING NORMALIZER FOR FLOATING POINT ARITHMETIC OPERATIONS

[75] Inventors: Clarence R. Ogilvie; Paul C. Stabler, both of Huntington, Vt.

[73] Assignee: International Business Machines Corporation, Armonk, N.Y.

[21] Appl. No.: 381,783

[22] Filed: Jan. 31, 1995

[51] Int. Cl.$^6$ .................................. G06F 5/01; G06F 7/48
[52] U.S. Cl. ........................................ 364/748; 364/715.04
[58] Field of Search ............................. 364/715.04, 748, 364/745

[56] References Cited

U.S. PATENT DOCUMENTS

| | | | |
|---|---|---|---|
| 4,758,972 | 7/1988 | Frazier | 364/745 |
| 4,779,220 | 10/1988 | Nukiyama | 364/748 |
| 4,926,370 | 5/1990 | Brown et al. | 364/748 |
| 4,975,868 | 12/1990 | Freerksen | 364/748 |
| 4,994,996 | 2/1991 | Fossum et al. | 364/748 |
| 5,204,832 | 4/1993 | Nakakura | 364/788 |
| 5,222,037 | 6/1993 | Taniguchi | 364/748 |
| 5,337,265 | 8/1994 | Desrosiers et al. | 364/748 |
| 5,373,461 | 12/1994 | Bearden et al. | 364/748 |
| 5,392,228 | 2/1995 | Burgess et al. | 364/715.04 |
| 5,430,668 | 7/1995 | Hagihara | 364/748 |

*Primary Examiner*—David H. Malzahn
*Attorney, Agent, or Firm*—Richard M. Goldman

[57] ABSTRACT

A method and apparatus for parallel "normalize-round-normalize" floating point arithmetic. The rounding-normalizer of the invention receives as an input an infinitely precise mantissa which is the result of a floating point operation. This infinitely precise result mantissa is broken into two fields, the Close Enough Bits, and the Picky Bits. These bits are selectively passed to four parallel data paths for taking close enough bits and picky bits and producing a correctly rounded mantissa. The paths are, respectively; (a) a 1X.XX ... X data path for mantissas greater than or equal to 2 but less than 4, the data path right shifting the upper bits and adjusting the exponent by +1 or +2; (b) a 01.XX ... X data path for mantissas greater than or equal to 1 but less than 2, the data path right shifting the upper bits and adjusting the exponents by +0 or +1; (c) a 00.1X ... X data path for mantissas greater than or equal to ½ but less than 1, the data path left shifting bits and adjusting the exponent by −1 or +0; and (d) a 00.01X ... X data path for mantissas less than ½, the data path left shifting the bits and adjusting the exponent by the shift amount. Each of the data paths produces a normalized and rounded mantissa for its subset of mantissas.

2 Claims, 6 Drawing Sheets

TABLE 1. OUTPUT SELECTION OF ROUNDING-NORMALIZER. A TRUTH TABLE FOR PROPER SELECTION OF A NORMALIZED, ROUNDED MANTISSA FROM THE LEFT SHIFTER AND VARIOUS ROUNDING INCREMENTORS IN THE FLOATING POINT ROUNDING NORMALIZER.

| INTERMEDIATE CLOSE ENOUGH BITS 0..2 | CARRY-OUT OF ROUNDING INCREMENTOR FOR PATH 1x.xx...x | CARRY-OUT OF ROUNDING INCREMENTOR FOR PATH 01.xx...x | CARRY-OUT OF ROUNDING INCREMENTOR FOR PATH 00.1xx...x | MUX INPUT SELECTED | EXPONENT ADJUSTED BY |
|---|---|---|---|---|---|
| 1xx | 0 | --- | --- | 0 | +1 |
| 1xx | 1 | --- | --- | 4 | +2 |
| 01x | --- | 0 | --- | 1 | +0 |
| 01x | --- | 1 | --- | 4 | +1 |
| 001 | --- | --- | 0 | 2 | -1 |
| 001 | --- | --- | 1 | 4 | +0 |
| 000 | --- | --- | --- | 3 | -(SHIFT AMOUNT) |

NOTE "---" INDICATES A DON'T CARE CONDITION

FIG.3

ROUNDING NORMALIZER FOR FLOATING POINT ARITHMETIC OPERATIONS

FIELD OF THE INVENTION

The invention relates to floating point processors for use in digital computers, and more particularly to a rounding normalizer for floating point addition and subtraction. The rounding normalizer has special utility in multi-media processors and graphics processors.

BACKGROUND OF THE INVENTION

A floating point number is defined by:

Number = (Mantissa) * $2^{Exponent}$ * $(-1)^{Sign}$
represented as

| Sign | Exponent | Mantissa |
| --- | --- | --- |

The mantissa is expressed as an n bit positive, illustrated herein by a 24 bit positive number with 0, 1, or 2 bits to the left of the "binary point" or a leading zero to the left of the "binary point" and 0, 1, or 2 leading zeroes to the right of the "binary point." One bit expresses the sign.

In the arithmetic operations of addition and subtraction, it is necessary to align the "binary points" of the binary numbers before addition or subtraction. This is to get the exponents equal. This can be accomplished by shifting the number with the smaller exponent [$Exponent_i - Exponent_j$] places to the right. Then the mantissas are added together. In the case of subtraction, the 2's complement of one number is added to the other number. The resulting sum is then normalized by shifting the mantissa to the left or right until the most significant bit is 1, and adjusting the exponent. This is called "normalization."

The IEEE Standard for Binary Floating Point Arithmetic (IEEE 754-1985) requires, as a minimum, normalization followed by rounding of the infinitely precise result. When rounding results in a "carry out" rounding must be performed again. Serial implementation or "normalize-round-normalize" is a frequent bottleneck in floating point digital signal processing engines.

OBJECTS OF THE INVENTION

It is a primary object of the invention to provide a high speed rounding normalizer for binary addition and subtraction.

It is a further object of the invention to provide a rounding normalizer for multi-media and graphics applications, especially for incorporation in a graphics processor, encoder, or decoder.

SUMMARY OF THE INVENTION

According to the invention a high speed rounding normalizer is provided for binary addition and subtraction. The high speed rounding normalizer is particularly useful for multi-media and graphics applications, and especially for incorporation in a graphics processor, encoder, or decoder.

These and other objects of the invention are obtained by the rounding normalizer method and structure shown and described below.

The invention relates to a parallel data path rounding normalizer for floating point arithmetic operations. The rounding normalizer has four data paths. The data paths are parallel data paths and are used for taking close enough bits and picky bits and producing a correctly rounded mantissa. These data paths include:

(a) a 1X.XX . . . X data path for mantissas greater than or equal to 2 but less than 4, this data path right shifts the upper bits and adjusts the exponent by +1 or +2;

(b) a 01.XX . . . X data path for mantissas greater than or equal to 1 but less than 2; this data path right shifts the upper bits and adjusts the exponents by +0 or +1;

(c) a 00.1X . . . X data path for mantissas greater than or equal to ½ but less than 1, this data path left shifts bits and adjusts the exponent by −1 or +0; and (d) a 00.01X . . . X data path for mantissas less than ½, this data path left shifts the bits and adjusts the exponent by the shift amount. This data path is also referred to as the left shifter. Each of the data paths produces a normalized and rounded mantissa for its subset of mantissas.

The rounding normalizer includes one of the data paths, the 00.01X . . . X data path, as a shifter operating in parallel with the parallel data paths.

THE FIGURES

The invention can be understood by reference to the Figures.

DETAILED DESCRIPTION OF THE INVENTION

Figure 1:
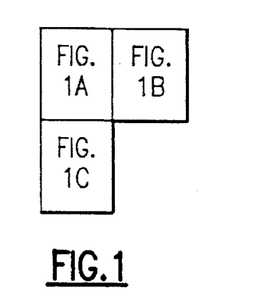
FIG. 1 shows the rounding normalizer of the invention.
Figure 1A:
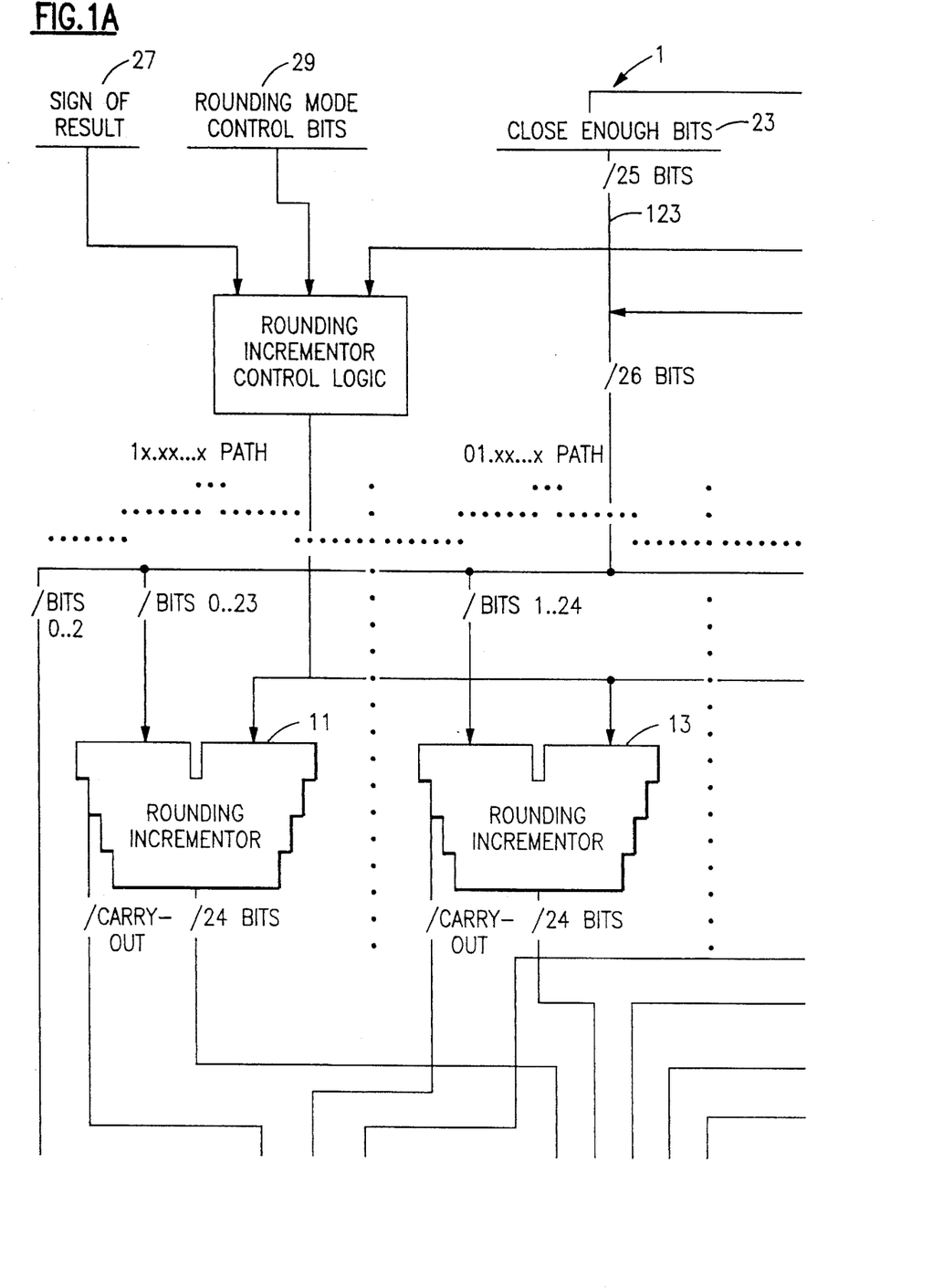
Figure 1B:
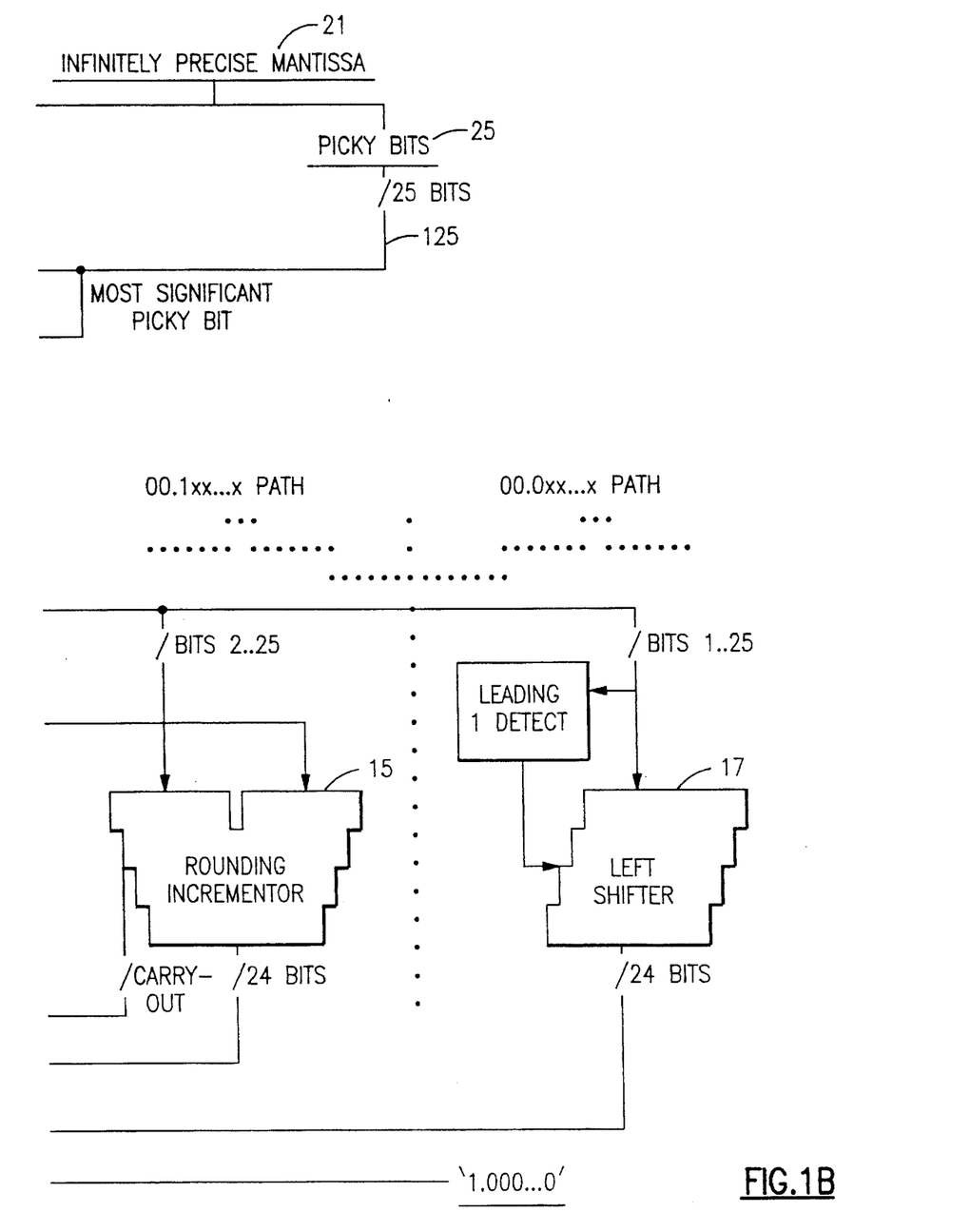
Figure 1C:
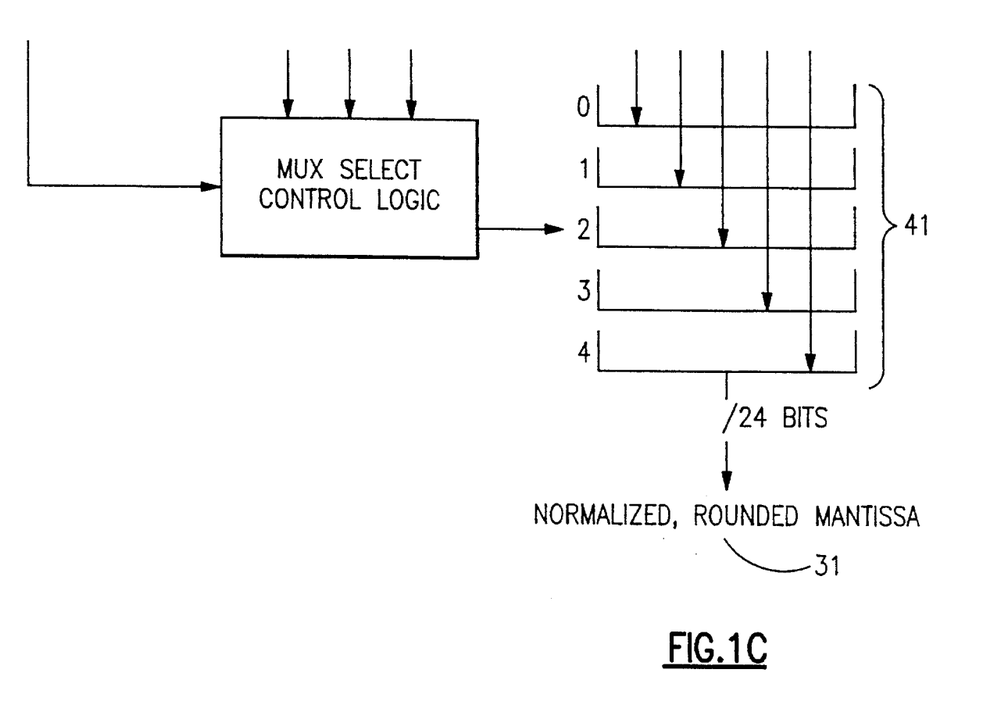

The invention relates to a rounding normalizer 1 for floating point arithmetic, especially the intense floating point arithmetic encountered in multi-media digital signal processing. The normalizer includes parallel data paths, 11, 13, 15, 17, where the data path selected depends on the magnitude of the mantissa.

By taking advantage of certain properties of floating point arithmetic, this invention enables the "normalize-round-normalize" operation to be implemented in a parallel manner. Carrying out "normalize-round-normalize" in a parallel manner significantly improves the performance of the "normalize-round-normalize" operation.

The rounding-normalizer 1 of the invention receives as an input an infinitely precise mantissa which is the result of a floating point operation. This infinitely precise result mantissa is broken into two fields, the Close Enough Bits, and the Picky Bits.

"Close enough bits" are bits in the infinitely precise mantissa of a result that are saved in the destination's mantissa, but only after being rounded. For single precision, these are the upper 24 bits of the infinitely precise result. Close enough bits have higher significance then the "picky bits."

A "denormalized number" is a non-zero floating point number whose exponent has a reserved value (zero for single precision), and whose leading implicit mantissa (just to the left of the "binary point") is zero. For single precision floating point denormalized numbers, the unbiased exponent is defined to be −126.

"Equalize" as applied to addition or subtraction of two floating point numbers means to shift the mantissa of one floating point number relative to the other floating point number with corresponding increments or decrements of the shifted number's exponent, until the exponents of the two floating point numbers are equal.

A "Normalized number" is a non-zero floating point number whose exponent is not reserved and whose leading implicit mantissa bit, just to the left of the "binary bit" is one. For single precision floating point normalized numbers, the biased exponent is defined to be between 0 and 255.

"Picky bits" are bits in the infinitely precise mantissa of a result with lower significance than the least significant bit of the destination's mantissa. These bits are examined during rounding and are then discarded.

"Rounding mode control bits" are bits that describe which of the four rounding modes required by the IEEE Standard, above, are to be used in the rounding of an infinitely precise result.

The bits of intermediate results and/or of data are selectively passed to four parallel data paths for taking close enough bits and picky bits and producing a correctly rounded mantissa. The paths are, respectively, (a) a 1X.XX ... X data path for mantissas greater than or equal to 2 but less than 4, the data path right shifting the upper bits and adjusting the exponent by +1 or +2;

(b) a 01.XX ... X data path for mantissas greater than or equal to 1 but less than 2, the data path right shifting the upper bits and adjusting the exponents by +0 or +1;

(c) a 00.1X ... X data path for mantissas greater than or equal to ½ but less than 1, the data path left shifting bits and adjusting the exponent by −1 or +0; and (d) a 00.01X ... X data path for mantissas less than ½, the data path left shifting the bits and adjusting the exponent by the shift amount.

Each of the data paths 11, 13, 15, 17, produces a normalized and rounded mantissa for its subset of mantissas.

FIG. 1 shows the Rounding-Normalizer, 1, of the invention. The Rounding-Normalizer, 1, receives as an input the infinitely precise mantissa which is the result of the addition or subtraction of properly equalized floating point mantissas. The infinitely precise result mantissa is broken into two fields as shown in FIG. 1. These fields are the Close Enough Bits, 23, and the Picky Bits, 25. Also shown as inputs to the Rounding-Normalizer, 1, are the sign of the result, 27, and the rounding mode control, 29, bits. In accordance with the invention, the output of the Rounding-Normalizer is a properly normalized and rounded mantissa, 31.

To be noted in FIG. 1 are the four data paths. The four data paths are, as noted above, the 1x.xxx ... x path, 11, the 01.xxx ... x path, 13, the 00.1xx ... x path, 15, and the 00.00x ... x path, 17.

This is an exhaustive enumeration of all possible results from the adder-subtractor, broken into four subsets. The left-most path in FIG. 1, also shown in FIG. 2, the 1x.xxx ... x path, 11, receives the subset of all mantissas that are greater than or equal to decimal 2, but less than decimal 4. The 01.xxx ... x data path, 13, receives the subset of all mantissas greater than decimal 1 but less than decimal 2. The 00.1xx ... x data path, 15, receives the subset of all mantissas greater than decimal ½ but less than decimal 1. Finally, the right-most data path in FIG. 1, the 00.0xx ... x data path, 17, receives the subset of all mantissas less than decimal ½.

The multiplexor, 41, at the bottom of FIG. 1 is controlled so that it selects the correct data path based on the four subsets.

Each of the four data paths produces a correctly normalized and rounded 24-bit mantissa for its particular subset of mantissas. FIG. 1 shows the highly parallel nature of the Rounding Normalizer, especially when compared to a serialized normalize-round-normalize processor of the prior art. The left shifter, 17, operates in parallel with the individual rounding incrementors. By way of contrast, in a serial round-normalize-round processor, the rounding incrementor doesn't operate until after the left shifter. The parallel nature of rounding incrementor and the left shifter, 17, offers a significant increase in performance over the prior art serial normalize-round- normalize processor.

The parallel nature of the Rounding Normalizer, 1, of the invention is enabled by the fact that in floating point addition and subtraction, infinitely precise mantissas that require a left shift for normalization of more than one bit do not have any picky bits. This means that rounding is not required. This will be illustrated below, first with the addition and subtraction of normalized IEEE binary floating point numbers, and then with the addition and subtraction of denormalized IEEE floating point numbers.

Non-zero, normalized IEEE binary floating point numbers have a mantissa with a minimum value of one (that is, 1.000 0000 0000 0000 0000 0000$_b$), the minimum result mantissa from the addition of two such numbers is just over one (that is, 1.000 xxxx xxxx xxxx xxxx 0001$_b$). Likewise, the maximum result mantissa from the addition of two non-zero, normalized IEEE binary numbers is just under four (that is, 11.111 1111 1111 1111 1111 1110$_b$). From this, it is seen that the maximum shift amount required for the normalization of the floating point sum of two non-zero, normalized, floating point IEEE numbers is one bit to the right. The number of picky bits generated depends upon the difference in the exponents of the two numbers, and whether or not the result mantissa is greater than or equal to two (1x.xxx xxxx xxxx xxxx xxxx xxxx$_b$).

Three scenarios are possible with the subtraction of two non-zero, normalized, IEEE binary floating point numbers: (1) subtraction of two numbers with equal exponents, (2) subtraction of two numbers with exponents that differ by only 1, and (3) subtraction of two numbers with exponents that differ by 2 or more. For each of these categories, the maximum and minimum result mantissas can be determined, and observations made concerning the number of picky bits, and whether or not rounding is required.

1. SUBTRACTION WITH EXPONENTS EQUAL

The maximum result mantissa that can be obtained is illustrated as follows:

Input A → 1.111 1111 1111 1111 1111 1111$_b$ × $2^4$
Input B → −1.000 0000 0000 0000 0000 0000$_b$ × $2^4$
Result → 0.111 1111 1111 1111 1111 1111$_b$ × $2^4$ This illustrates that the maximum result mantissa for a floating point subtraction with exponents equal is a number that must be shifted left by one bit for normalization. There are no picky bits.

The minimum result mantissa for a floating point subtraction of two non-zero normalized numbers with equal exponents can be obtained when both the input mantissas are the same. This results in a value of zero. Therefore, for subtraction with the exponents equal, the range of result mantissas is from 0.111 1111 1111 1111 1111 1111$_b$ to 0.000 0000 0000 0000 0000 0000$_b$.

There are two points to be observed from this. First, there are no picky bits. This means that rounding is not required. Second, note that in order to normalize the results in this range of values, a left shift must be performed, with the amount of the shift being from one bit to twenty-three bits.

2. SUBTRACTION WITH EXPONENTS DIFFERING BY ONE

When the exponents of the inputs to a Subtraction differ by one, the mantissa of the input with the smaller exponent is shifted to the right by one bit. Consider the maximum result mantissa for:

Input A → 1.111 1111 1111 1111 1111 1111$_b$ × $2^{24}$
Input B → −1.000 0000 0000 0000 0000 0000$_b$ × $2^{23}$ which is equalized to:

Input A → 1.111 1111 1111 1111 1111 1111 0$_b$ × $2^{24}$
Input B → −0.100 0000 0000 0000 0000 0000 0$_b$ × $2^{24}$
Result → 1.011 1111 1111 1111 1111 1111 0$_b$ × $2^{24}$ with a zero value picky bit.

The minimum result mantissa can be obtained as follows:

Input A → 1.000 0000 0000 0000 0000 0000$_b$ × $2^{24}$
Input B → −1.111 1111 1111 1111 1111 1111$_b$ × $2^{23}$ which is equalized to:

Input A → 1.000 0000 0000 0000 0000 0000 0$_b$ × $2^{24}$
Input B → −0.111 1111 1111 1111 1111 1111 1$_b$ × $2^{24}$
Result → 0.000 0000 0000 0000 0000 0000 1$_b$ × $2^{24}$ with a picky bit having a value of 1.

The range of result mantissas is from 1.011 1111 1111 1111 1111 1111 0$_b$ to 0.000 0000 0000 0000 0000 0000 1$_b$.

Normalization of the minimum result will require a left shift of 24 bits. Note that when the result is less than ½ (0.0xxx ... xxxx 1$_b$) rounding is not required because the picky bit becomes part of the mantissa after normalization.

3. SUBTRACTION WITH EXPONENTS DIFFERING BY TWO OR MORE

Consider the case of

Input A → 1.111 1111 1111 1111 1111 1111$_b$ × $2^{69}$
Input B → −1.000 0000 0000 0000 0000 0000$_b$ × $2^{67}$ which is equalized to:

Input A → 1.111 1111 1111 1111 1111 1111 00$_b$ × $2^{69}$
Input B → −0.010 0000 0000 0000 0000 0000 00$_b$ × $2^{69}$
Result → 1.101 1111 1111 1111 1111 1111 00$_b$ × $2^{69}$ which has the two picky bits 00$_b$.

The minimum result mantissa for this condition is given by:

Input A → 1.000 0000 0000 0000 0000 0000$_b$ × $2^{69}$
Input B → −1.111 1111 1111 1111 1111 1111$_b$ × $2^{67}$ which is equalized to:

Input A → 1.000 0000 0000 0000 0000 0000 00$_b$ × $2^{69}$
Input B → −0.011 1111 1111 1111 1111 1111 11$_b$ × $2^{69}$
Result → 0.100 0000 0000 0000 0000 0000 01$_b$ × $2^{69}$ with picky bits 01$_b$.

Normalization of this minimum result mantissa requires only a one bit left shift. Consider that the subtraction of 1−(½−$2^{-25}$) gives a resultant mantissa of just over ½. Extending this idea to floating point numbers with exponents that differ by more than two, one can see that the result will always be greater than ½. This means that the normalization of the result for this scenario will always require a one bit left shift.

4. DENORMALIZED NUMBERS

There are two scenarios to consider in the normalize-round-normalize process of floating point addition and subtraction results when one or both inputs to the addition or subtraction are denormalized numbers. First, the addition and subtraction of two denormalized numbers, and second the addition and subtraction of a denormalized number with a normalized number.

ADDITION AND SUBTRACTION OF TWO DENORMALIZED NUMBERS

By definition, the exponent of a denormalized number is −126. Therefore, the addition or subtraction of two denormalized numbers means that both inputs have the same exponent. The result mantissa of the addition of two (non-zero) denormalized numbers ranges from 1.111 1111 1111 1111 1111 1110$_b$ to 0.000 0000 0000 0000 0000 0010$_b$.

Note that rounding is not required anywhere in this range. Also, normalization is not required because the result is already a normalized number or a denormalized number.

The range of result mantissas for the subtraction of two non-zero denormalized numbers is: 0.111 1111 1111 1111 1111 1110$_b$ to 0.000 0000 0000 0000 0000 0000$_b$.

Rounding and normalization are not required.

ADDITION AND SUBTRACTION OF A DENORMALIZED NUMBER AND A NORMALIZED NUMBER

The range of result mantissas for the addition of a normalized and a denormalized number is 10.111 1111 1111 1111 1111 1110$_b$ to 1.000 xxxx ... xxx01$_b$.

The low limit of this range can have quite a few picky bits, depending on the exponent of the normalized input number. This is indicated by "xxxx ... xxx." The maximum shift for normalization is one bit to the right. Rounding is required for many of the values in this range.

When considering the subtraction of a denormalized number and a normalized number, it is possible to consider two cases: subtraction where the exponents differ by one, and subtraction when the exponents differ by two or more. In this regard, note that if a denormalized number were to be "normalized" it would have an exponent of −127. Since the smallest IEEE floating point number has an exponent of −126, there is no case in the subtraction of a denormalized number and a normalized number where the exponents are equal.

Considering the scenario of the subtraction of a denormalized number and a normalized number, with an exponent difference of one, the range in results mantissas is from: 1,111 1111 1111 1111 1111 1110$_b$ to 0.000 0000 0000 0000 0000 0001$_b$.

Note that rounding is not required because there are no picky bits. Also, note that normalization is not required because the result is either an already normalized number, or a denormalized number.

Consider the scenario of the subtraction of a denormalized number and a normalized number whose exponents differ by two or more. The range of result mantissas is from: 1.111 . . . 110$_b$ to 0.100 0000 0000 0000 0000 0000 1$_b$.

Although rounding is required, the normalization of the result prior to rounding requires a maximum of a one bit left shift.

SUMMARY OF FLOATING POINT ADDITION AND SUBTRACTION

The following observations can be made based on the above illustrations. First, normalization of the result mantissa requires more than one bit shift only for the subtraction of two normalized floating point numbers with exponents that differ by one or zero. Second, when normalization requires more than a one bit shift, rounding is not required. This is because either the addition or subtraction did not generate any picky bits, or because the addition or subtraction generated one or two picky bits, but these became part of the close enough bits once the mantissa is normalized. Third, rounding may be required with the normalization shift amounts of a one bit shift to the right, no shifting, or a one bit shift to the left.

Thus, left shifting of more than one bit can be performed in parallel with rounding, provided that the correct data path is chosen as the normalized-rounded-normalized result.

SELECTION OF THE CORRECT RESULT DATA PATH

The shift required for normalization of the 1x.xx ... x$_b$ and 00.1xx ... x$_b$ is performed by the correct selection of the bits which are used as inputs to the Rounding Incrementor, 11, 13 or 15. The 1x.xx . . . $x_b$ path "shifts" the mantissa by selecting the upper 24 bits (bits 00 to bits 23) of the Close Enough Bus, 123, as input to the rounding incrementor, 11. The 00.1xx . . . x path, 15, "shifts" the mantissa by selecting bits 2 to 24 of the close enough bus, 123, concatenated with bit 00 of the Picky Bit Bus, 125. In this regard, note that the Close Enough Bus, 123, concatenated with the Picky Bit Bus, 125, forms the infinitely precise result mantissa. The 01.xx . . . x path, 13, does not require shifting for the standpoint of normalization, but the correct bits must be selected as inputs to the Rounding Incrementor, 13. This means that bits 01 to 24 of the Close Enough Bus, 123, are used as inputs to the Rounding Incrementor. By shifting the 24 bit "window" used as inputs to the Rounding Incrementors, the result mantissa is effectively normalized before rounding is performed.

The output multiplexor, 41, shown in FIG. 1 must be controlled so that the correct path is selected for the final, normalized and rounded, result. The Close Enough Bits must be analyzed in order to determine which path the mantissa should "follow" for rounding and normalizing. Table 1 is a truth table for the correct selection of the Normalized, Rounded result mantissa. The first column of this table contains the three upper bits (00 to 02) of the Close Enough Bits. As can be seen, the definitions of these bits matches the first three bits of the path description in FIG. 1. For example, when table 1 shows "1xx" for the close enough bits, the "1x.xx . . . $x_b$" path is selected in FIG. 1. Of course, this corresponds to all values greater than or equal to 2 but less than 4.

Although the Rounding Incrementors have been mentioned several times, not much explanation has been provided. Simply put, these devices take the picky bits and the close enough bits and produce a correctly rounded mantissa. The Rounding Mode Control 29 bits are used to determine which rounding mode the Rounding Incrementors are to use when rounding.

Rounding a mantissa may result in a carry which propagates all the way through the mantissa. When this happens, the rounded result must be renormalized by shifting one bit to the right, and the exponent must be incremented. The second, third, and fourth column in FIG. 3 describe how this rounding overflow is implemented in the Rounding Normalizer. In these columns, one can see that the Multiplexor Input #4 is selected whenever the carry-out of the selected Incrementor is $1_b$. Of course, the carry-out signals a rounding overflow. As can be seen from FIG. 1, Multiplexor Input #4 is hardwired to 1.000 0000 0000 0000 0000 $0000_b$. This will always be the correct mantissa when a rounding overflow occurs.

Figure 3:
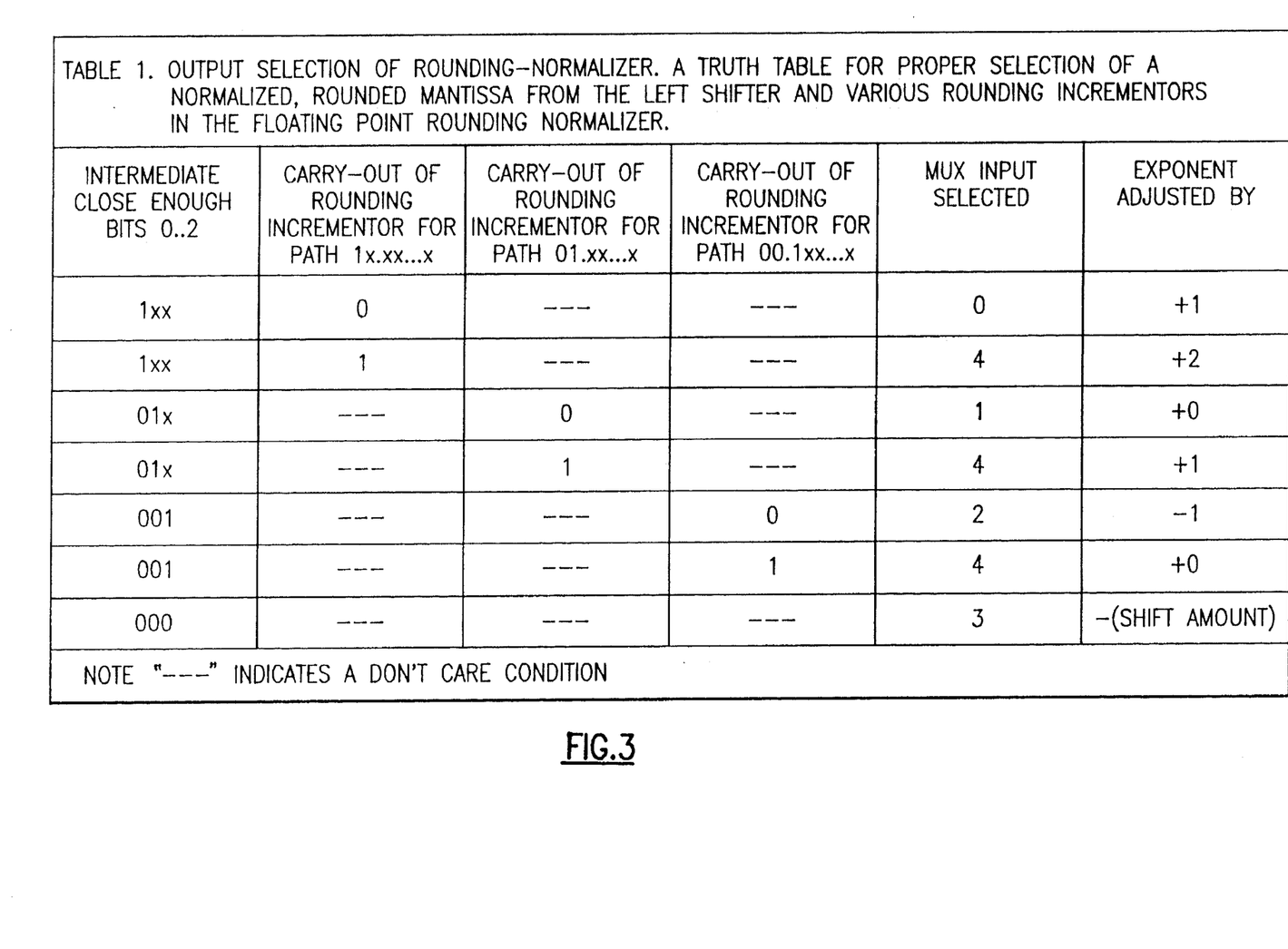
FIG. 3 is a truth table for the correct selection of the Normalized, Rounded result mantissa. The second, third, and fourth columns in FIG. 3 describe how rounding overflow is implemented in the Rounding Normalizer.

The right-most column in FIG. 3 defines how the exponent is to be adjusted by the various actions that take place in the Rounding-Normalizer. For instance, the first row indicates that when the 1x.xx . . . x path, 11, is selected and the carry-out of the Rounding Normalizer is $0_b$, the exponent should be adjusted by adding one, (1). This is because the mantissa will be effectively shifted to the right by one bit. The second row shows that when the 1x.xx . . . x is selected and the carry-out of its Rounding Incrementor is $1_b$, the exponent should be adjusted by adding two, 2. This is because the mantissa will be shifted to the right by two bits. When the 00.0xx . . . x path, 17, is selected, the exponent is adjusted by subtracting the number of bits the mantissa was left shifted. See, in FIG. 1 that bits 1 through 25 are used as inputs to the left shifter, which is in the 00.0xx . . . x path. This is a total of 25 bits, not 24. This is done because the examples in the previous discussion show that there is one and only one, picky bit that needs to be included when the mantissa needs to be shifted by two or more bits to the left.

With further reference to FIG. 1, it is noted that the Left-Shifter, 17, is controlled by logic called "Leading $1_b$ Detect." This is exactly what the logic does. The logic detects where the most significant $1_b$ occurs in the result mantissa. Using this information, it determines how many bits the Left-Shifter, 17, needs to shift in order to place the leading $1_b$ in the most significant bit position.

DETAILS OF ROUNDING INCREMENTORS

Figure 2:
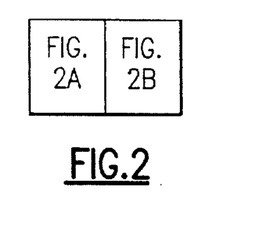
FIG. 2 shows a rounding incrementor and control logic for the 1x.xx . . . x data path.
Figure 2A:
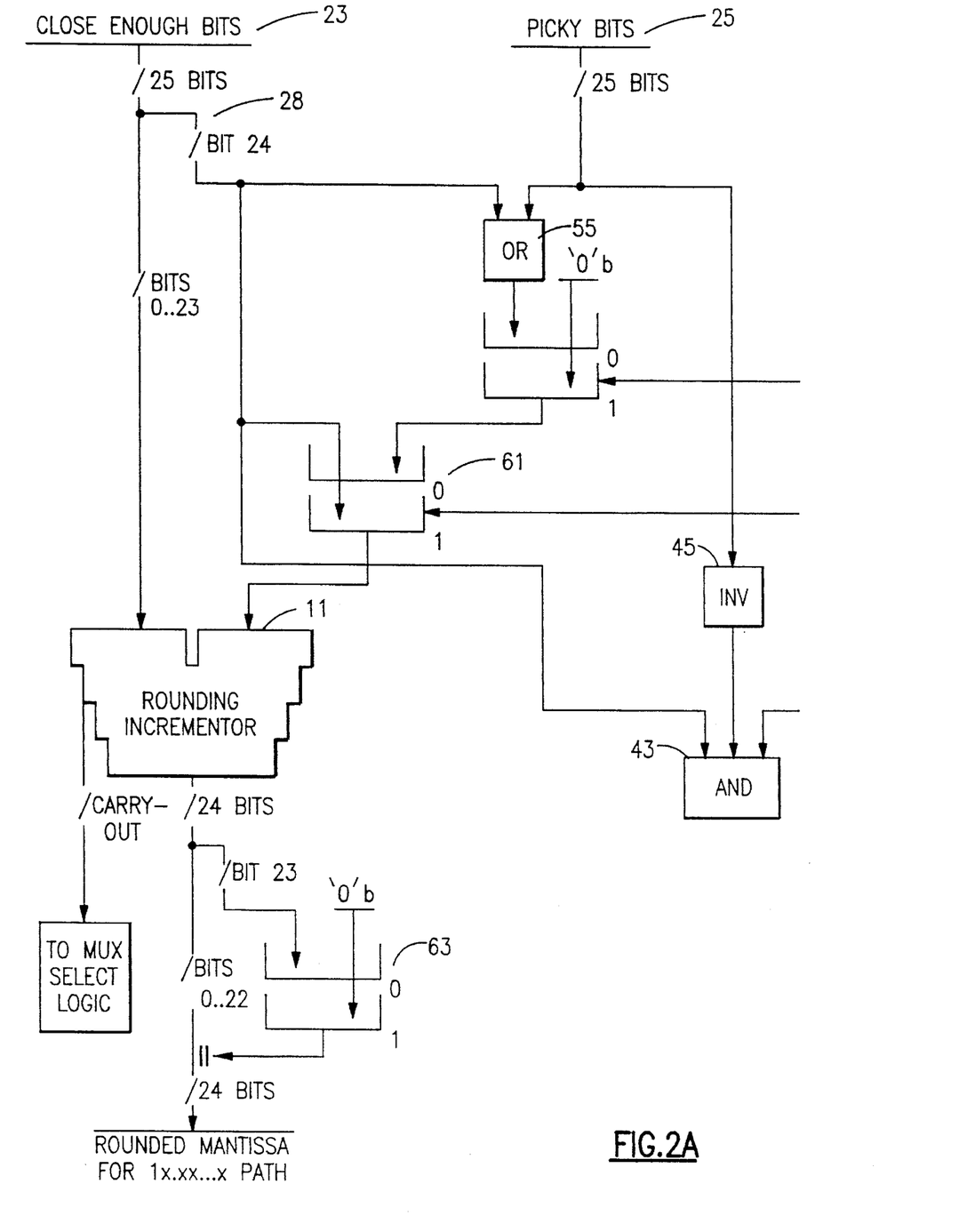
Figure 2B:
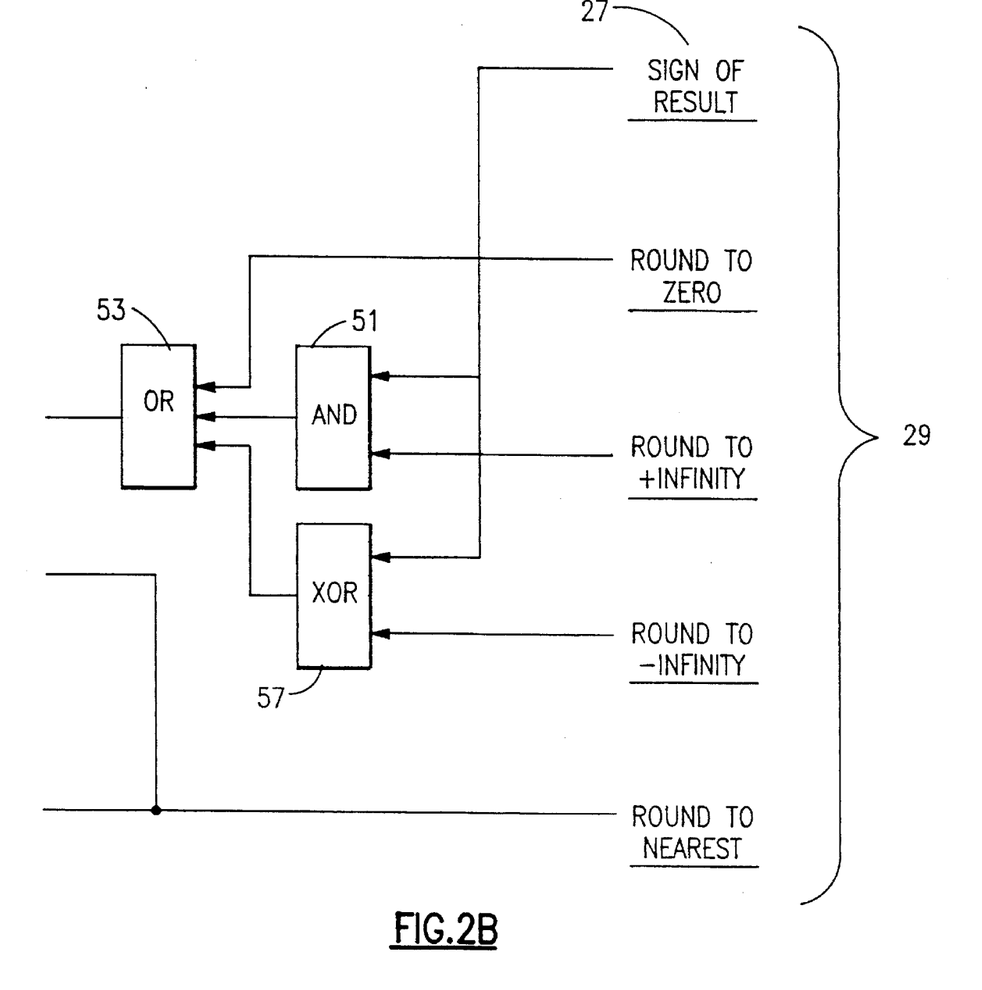

FIG. 2 shows an implementation of the Rounding Incrementor in the 1x.xx . . . x data path, 11. It is exemplary of the other rounding incrementors.

The inputs to the Rounding Incrementor are the Close Enough Bits, 23, the Picky Bits, 25, the Sign of the result, 27, and the Rounding Mode Control, 29, signals. It is to be noted that only one of the four Rounding Mode Control, 29, signals will be active at the same time. Consider the four Rounding Mode Control, 29, signals.

ROUND TO NEAREST

In the Round to Nearest mode, the Multiplexor, 61, immediately preceding the right side of the adder selects Bit 24 of the Close Enough Bits, 23. The reason this is done is that this bit is actually the Most Significant Picky Bit, 28. Because this is the 1x.xx . . . x path, 11, the 24-bit "window" used for rounding consists of bits 00 through 23 of the Close Enough bits, 23. That leaves bit 24 of the Close Enough bits, 23, as the Most Significant picky bit, 28.

Note that this Most Significant Picky Bit, 28, is fed into the right side of the 24 bit adder when in the Round to Nearest Mode. Note that the Most Significant picky bit, 28, when set to $1_b$, indicates that the infinitely precise result is either (1) equally near the two nearest representable 24 bit values, or (2) closer to the representable 24 bit value which has the greatest magnitude.

The most significant picky bit, 28, is also referred to as the "Guard Bit." Using the Guard Bit as the input to the right side of the adder in FIG. 1 means that the mantissa will be incremented whenever the infinitely precise result is either halfway between the two nearest reasonable values, or when the infinitely precise result is closer to the representable value with the greatest magnitude.

The Most Significant Picky Bit, 28, is also fed into an AND gate, 43, along with the Round to Nearest Mode Control bit, 29, and the inverse, 45, of the rest of the picky bits, 25. This means that when the Round to Nearest mode is active and the picky bits are exactly halfway between the two nearest representable (24-bit) values (1000 . . . $0_b$), that the output of the AND gate, 43, will be $1_b$. This output controls the lowest multiplexor, 63, in FIG. 2. This multiplexor, 63, is used to force the Least Significant Bit of the rounded result mantissa to a $0_b$. This multiplexor, 63, implements the requirement of rounding to the nearest even mantissa when in the Round to Nearest mode and the Infinitely Precise Mantissa is exactly halfway between the two nearest precision values. Of course, if the Infinitely Precise Result is not exactly halfway between the two nearest single precision values, OR Round to Nearest Mode is not active, the Least Significant bit of the mantissa will pass through the Multiplexor unchanged.

The combination of feeding the Most Significant Picky Bit into the Incrementor plus multiplexing the Least Significant bit of the Incrementor output provides all of the function required in the Round to Nearest Mode.

ROUND TO ZERO MODE

From FIG. 2, it is seen that when the Round to Zero mode is active, the upper most Multiplexor feeds 0b into the right side of the Adder. This means that the result mantissa passes through the adder unchanged, effectively truncating the picky bits. This is all that is required of the Round to Zero mode.

ROUND TO POSITIVE INFINITY MODE

When the Round to Positive Infinity mode is active and the sign of the result is negative, the picky bits are truncated. This function is implemented by the right-most AND gate, 51, along with the subsequent OR gate, 53, shown in FIG. 2. When the Round to Plus Infinity signal is active and the sign of the result is $1_b$, a $0_b$ will again be multiplexed into the right side of the adder, effectively truncating the Picky Bits. However, if the Round to Plus Infinity mode is active but the Sign of the Result is Positive, $0_b$, the result mantissa should be incremented if any of the picky bits are $1_b$. This is accomplished by the upper most OR gate, 55, in FIG. 2. When the Round to Positive Infinity mode is active and the sign of the result is Positive, $0_b$, the output of this OR gate is fed to the right side of the Adder. This means that if any of the Picky Bits is a $i_b$, the result mantissa will be incremented.

ROUND TO NEGATIVE INFINITY

The Round to Negative Infinity mode is the reverse of the Round to Positive Infinity mode. It can be seen from the XOR gate, 57, on the right side of FIG. 2 that when the Round to Negative Infinity Control Signal is active and the Sign of the Result is positive, a $0_b$ is fed into the right side of the adder. This means that the result mantissa is passed unchanged, and the Picky Bits are effectively truncated. However, when in the Round to Negative Infinity mode with a negative sign, $1_b$, the output of the OR gate, 55, of all of the picky bits is fed into the right side of the adder. This means that the result mantissa will be incremented if any of the picky bits is a $1_b$.

ROUNDING INCREMENTORS FOR THE 01.XX . . . X AND 00.1XX . . . X PATHS

The rounding-incrementors for the 01.xx . . . x and 00.1xx . . . x paths are very similar to the Rounder-Incrementor shown in FIG. 2 for the 1x.xx . . . x path. However, note that the 24 bit "window" used for the result mantissa is shifted over one bit to the right for the 01.xx . . . x path and two bits to the right for the 00.1xx . . . x path. This means that, for the 01.xx . . . x path, the result mantissa is chosen from bits 01 to 24 of the Close Enough Bit inputs and the Most Significant Picky Bit is bit 00 of the Picky Bit inputs. For the 00.1xx . . . x path, the result mantissa is chosen from bits 02 to 24 of the Close Enough bits inputs concatenated with bit 00 of the Picky Bit inputs and the Most Significant picky bit becomes bit 01 of the Picky Bit inputs.

While the invention has been described with respect to certain preferred embodiments and exemplifications, it is not intended to limit the scope of the invention thereby, but solely by the claims appended hereto.

We claim:

1. A parallel data path rounding normalizer for floating point arithmetic operations comprising four parallel data paths for taking a mantissa having close enough bits and picky bits and producing a correctly rounded mantissa, said data paths comprising:

a. a 1X.XX . . . X data path for mantissas greater than or equal to 2 but less than 4, said data path having means for right shifting the close enough bits and adjusting the exponent by +1 or +2;

b. a 01.XX . . . X data path for mantissas greater than or equal to 1 but less than 2, said data path having means for right shifting the close enough bits and adjusting the exponents by +0 or +1;

c. a 00.1X . . . X data path for mantissas greater than or equal to ½ but less than 1, said data path having means for left shifting bits and adjusting the exponent by −1 or +0; and d. a 00.01X . . . X data path left shifter for mantissas less than ½, said data path having means for left shifting the bits and adjusting the exponent by the shift amount;

whereby each of said data paths produces a normalized and rounded mantissa for its subset of mantissas.

2. A method of rounding the results of floating point arithmetic operations comprising inputing intermediate results to a parallel data path rounding normalizer comprising four parallel data paths each data path having means for taking a mantissa having close enough bits and picky bits and producing a correctly rounded mantissa, said method comprising:

a. inputting the intermediate results having mantissas greater than or equal to 2 but less than 4 to a 1X.XX . . . X data path and right shifting the close enough bits and adjusting the exponent by +1 or +2;

b. inputting the intermediate results having mantissas equal to 1 but less than 2 to a 01.XX . . . X data path and right shifting the close enough bits and adjusting the exponents by +0 or +1;

c. inputting intermediate results having mantissas greater than ½ but less than 1 to a 00.1X . . . X data path and left shifting bits and adjusting the exponent by −1 or +0; and d. inputting intermediate results having mantissas less than ½ to a 00.01X . . . X data path left shifter, left shifting the bits and adjusting the exponent by the shift amount;

whereby to produce a normalized and rounded mantissa for the result.

* * * * *